W. J. OVERBECK.
PROCESS FOR THE REDUCTION OF HYDROGENATED OIL.
APPLICATION FILED OCT. 7, 1918.

1,329,845.

Patented Feb. 3, 1920.

Inventor:
William J. Overbeck
By Allen & Allen
Attorneys.

UNITED STATES PATENT OFFICE.

WILLIAM J. OVERBECK, OF CINCINNATI, OHIO.

PROCESS FOR THE REDUCTION OF HYDROGENATED OIL.

1,329,845.  Specification of Letters Patent.  Patented Feb. 3, 1920.

Application filed October 7, 1918. Serial No. 257,210.

*To all whom it may concern:*

Be it known that I, WILLIAM J. OVERBECK, a citizen of the United States, and a resident of Cincinnati, in the county of Hamilton and State of Ohio, have invented certain new and useful Improvements in Processes for the Reduction of Hydrogenated Oil, of which the following is a full, clear, and exact description, reference being made to the accompanying drawing, forming part of this specification.

The object of my invention is to reduce to a finely powdered condition oils and fats which have been hardened by saturation with hydrogen until they are normally solid at atmospheric temperature. It has become quite common to treat various vegetable oils with hydrogen in the presence of a catalyst to convert the mixed triglycerids into a fully saturized condition so that the resulting product is solid at atmospheric temperatures and can be transported and utilized for various purposes in a solid condition. For many purposes, the usefulness of the hydrogenized product can be largely increased if the material existed or could be obtained in powdered form.

It is the object of my invention to convert such hardened oil into a finely powdered state, which I accomplish in the manner and with the apparatus hereinafter described.

The reduction to a powdered state is obtained by heating the hardened product until it is liquefied, and while still in liquid condition converting the liquid into a fine spray by discharging the spray into a sufficiently cool atmosphere to solidify the small particles of the melted oil constituting the spray and allowing the same to be precipitated in a powdered form in a suitable receptacle. As an illustrative example of the method of producing the hydrogenated oil in powdered form, I have shown in the accompanying drawing an apparatus for carrying out the process, which process, however, it will be understood, is not to be restricted in any way to the apparatus disclosed.

Figure 1:
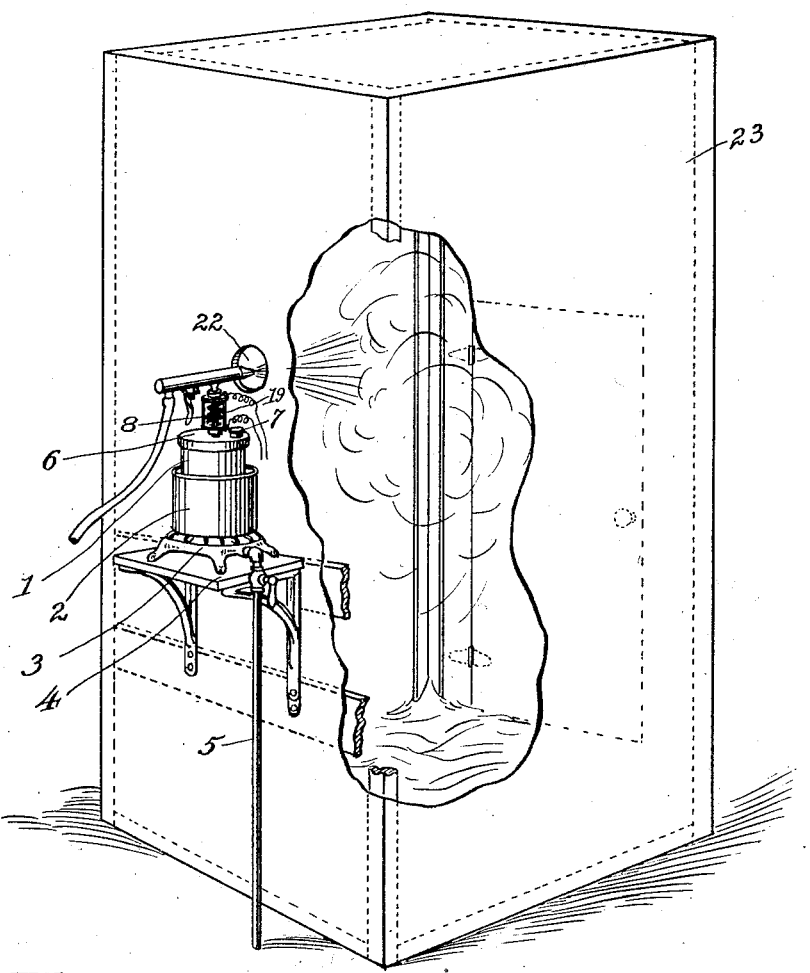
Figure 1 is a perspective view of an apparatus suitable for the purpose.
Figure 2:
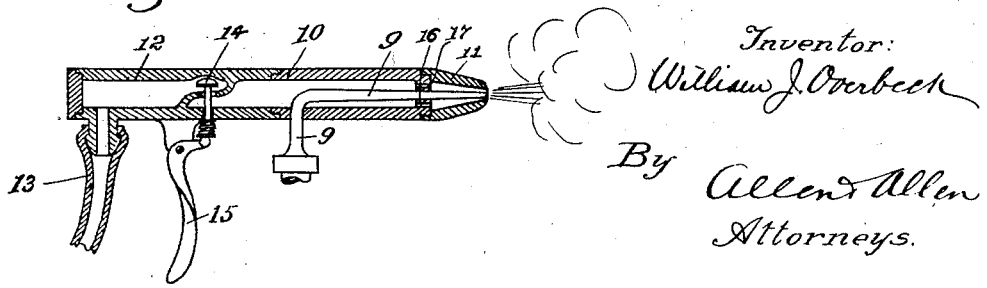
Fig. 2 is a central longitudinal section of the spraying device.

The hydrogenated product to be converted into a powder is first melted into a thin liquid in any suitable vessel. Such vessel is indicated at 1, seated in a casing 2, which is preferably lined with asbestos or some other nonconductor of heat. The vessel is shown in Fig. 1 as placed on a small gas heater 3, supported on a shelf 4, the heating gas being supplied through pipe 5. The vessel for holding the melted hydrogenated oil is for convenience provided with a close fitting top cover 6, having an opening for the pouring in of the liquid, where the same may be melted in some other receptacle in large quantities, this opening being closed by the screw cap 7. Extending up through the cover and down to the bottom of the vessel is a tube or pipe 8, the upper end of which is coupled to the oil pipe 9, which extends into the air gun 10 and outwardly to the nozzle 11. The air gun is of familiar construction for use as an atomizer and comprises the cylindrical casing 12 with an air supply pipe 13 through which the air is supplied to the atomizer under suitable pressure, say from fifty to one hundred pounds. For controlling the air supply, the atomizer is provided with an air valve 14, normally held shut by spring pressure and arranged to be opened by the finger pull 15. When the air valve is open, the air rushes out through the openings 16 in the plug 17, which closes the delivery end of the atomizer, four holes being provided equal distances apart. The nozzle 11 directs this current forcibly around the opening of the oil pipe, where the oil drawn up by suction from the nozzle is converted into a fine spray or mist. The oil tube 8, in order to maintain the material in liquid condition, is preferably heated by an electric heating coil 19.

In order to collect the powdered product, the nozzle of the apparatus is directed through an opening 22 in a collecting chamber 23. This collecting chamber and the apparatus as illustrated is a rectangular box of considerable size, the framework of which is covered with gauze material of proper thickness to prevent the passage of any of the powder, while permitting the air blown into the chamber through the spraying apparatus to escape therefrom. At atmospheric temperature the fine mist of atomized oil at once solidifies and the dust gathers in the base of the chamber, whence it can be readily removed through any suitable door or opening.

For many purposes the oil in this finely powdered form can be utilized more effectively than either the heated liquid or the hard product in the shape of blocks or cakes. The powdered oil is in many instances more economical for use, as it may be readily weighed for obtaining any desired quantity or proportion of the hydrogenized oil, and the user is thereby enabled to more readily prepare a desired mixture of which the hydrogenated oil is a component part, thus effecting a saving of time and avoiding all waste of material incidental to the use of hydrogenated oil in a hardened state.

The fineness of the powder is regulated and controlled by the air pressure used in the atomizer; the greater the pressure the finer the spray and the higher degree of pulverization obtained.

Having thus described my invention, what I claim as new and desire to secure by Letters Patent, is:—

1. The process of producing an impalpable powder from hydrogenated oil which consists in atomizing said oil when in a molten state into an atmosphere at a temperature lower than the temperature of the oil.

2. The process of producing an impalpable powder from hydrogenated oil which consists in converting the solid material into a liquid by heating and then atomizing said oil while still in a liquid condition into an atmosphere of air maintained at a temperature lower than the melting point of the hydrogenated oil.

3. A new and useful product comprising a hydrogenated oil in a condition of an impalpable powder produced by subjecting an atomized spray of the oil in melted condition to an atmosphere below the melting point of the oil.

WILLIAM J. OVERBECK.